United States Patent [19]
Tanaka

[11] Patent Number: 5,455,811
[45] Date of Patent: Oct. 3, 1995

[54] ELECTROMAGNETIC DRIVING APPARATUS INCLUDING OBJECTIVE LENS HOLDER HAVING DIRECTLY PLATED REFLECTING SURFACES

[75] Inventor: Akihiro Tanaka, Tokyo, Japan

[73] Assignee: Asahi Kogaku Kogyo Kabushiki Kaisha, Tokyo, Japan

[21] Appl. No.: 98,035

[22] Filed: Jul. 28, 1993

[30] Foreign Application Priority Data

Jul. 28, 1992 [JP] Japan .................................. 4-201047
Dec. 9, 1992 [JP] Japan .................................. 4-329228

[51] Int. Cl.⁶ .................................................. G11B 7/095
[52] U.S. Cl. .................................. 369/44.14; 369/44.32; 369/54
[58] Field of Search ................. 369/44.14–44.16, 369/44.22, 44.32, 54; 359/813–814, 823–824

[56] References Cited

U.S. PATENT DOCUMENTS

| | | | |
|---|---|---|---|
| 4,991,161 | 2/1991 | Ikegame et al. ................. | 369/44.16 X |
| 5,068,844 | 11/1991 | Tanaka ................................. | 369/44.16 |
| 5,072,433 | 12/1991 | Tanaka ................................. | 369/44.16 |
| 5,078,471 | 1/1992 | Takishima ......................... | 369/44.16 X |
| 5,103,345 | 4/1992 | Watanabe et al. ................ | 369/44.16 X |
| 5,117,410 | 5/1992 | Akiyama ........................... | 369/44.28 X |
| 5,140,471 | 8/1992 | Kasahara .......................... | 369/44.14 X |
| 5,161,067 | 11/1992 | Tomiyama et al. .............. | 369/44.16 X |
| 5,191,570 | 3/1993 | Shirai ................................. | 369/44.22 |
| 5,222,056 | 6/1993 | Tanaka ............................... | 369/44.22 |
| 5,241,528 | 8/1993 | Mohri et al. ...................... | 369/44.15 X |
| 5,321,678 | 6/1994 | Takishima et al. .............. | 369/44.32 X |

Primary Examiner—W. R. Young
Attorney, Agent, or Firm—Sandler, Greenblum & Bernstein

[57] ABSTRACT

An electromagnetic objective lens driving apparatus of an optical disc data recording and reproducing apparatus is provided. The apparatus includes a carriage that is movable in a radial direction of the optical disc, and an objective lens holder that is supported on the carriage to move in focusing and tracking directions of the optical disc. A pair of reflecting surfaces are provided on opposite end surfaces of the objective lens holder in the tracking direction, and are directly formed on the outer surfaces of the objective lens holder by plating. A pair of photo sensors is provided on the carriage to be opposed to the respective surfaces.

5 Claims, 13 Drawing Sheets

Frequency Response Function of Compliance

ELECTROMAGNETIC DRIVING APPARATUS INCLUDING OBJECTIVE LENS HOLDER HAVING DIRECTLY PLATED REFLECTING SURFACES

BACKGROUND OF THE INVENTION

1. Field of the Invention

The present invention relates to an optical data recording and reproducing apparatus which optically writes data onto or reads data from an optical disc. More precisely, it relates to a driving apparatus electromagnetically drives an objective lens thereof.

2. Description of Related Art

In a known optical disc apparatus, such as an opto-magnetic disc apparatus, an objective lens is held on a carriage which is movable in a radial direction (i.e., tracking direction) of the optical disc, and the objective lens is movable in the tracking direction and the focusing direction through an elastic member. To drive the objective lens in the tracking direction and the focusing direction, tracking and focusing coils are provided on a lens holder which holds the objective lens. A magnetic circuit which constitutes electromagnetic driving circuits together with the tracking and focusing coils is provided on the carriage. The focusing and tracking coils are supplied with predetermined directions and intensities of electric current to drive the objective lens holder by the electromagnetic driving circuits, so that the laser beams can be accurately converged onto the recording track of the optical disc.

In the optical data recording and reproducing apparatus, it is necessary to provide a position sensor to detect the position (i.e., displacement from a correct position) of the objective lens (or objective lens holder), particularly in the tracking direction of the optical disc, to thereby reduce the track access time.

The position sensor is usually includes a pair of reflecting surfaces formed on end surfaces of the objective lens holder in the tracking direction, and a pair of reflection type photo sensors on the carriage, each having a light emitter and a light receiver integral therewith, opposed to the corresponding reflecting surface. The outputs of the pair of photo sensors are identical at a neutral position of the objective lens holder in which the distances between the photo sensors and the corresponding reflecting surfaces are identical. When the objective lens holder is displaced from the neutral position, there is a difference in the output between the photo sensors, so that the displacement of the objective lens holder in the tracking direction can be detected in accordance with the output difference.

In the known position sensor, the reflecting surfaces are made of reflecting mirrors, which are separately constructed pieces secured to the end surfaces of the objective lens holder by an adhesive, for example. The adhering operation is, however, troublesome. In addition, it is difficult to precisely adhere both the reflecting mirrors to the corresponding end surfaces of the objective lens holder at correct positions, for example, due to a difference in position or thickness of the adhesive between the reflecting mirrors. This results in a failure to establish a precise optical location of the position sensor, leading to an incorrect detection thereby. To correct the error, an additional troublesome adjustment is necessary.

Moreover, in the known electromagnetic driving apparatus, the sensitivity at a low frequency band must be high, to obtain a high dynamic range. However, to realize this, the compliance of the objective lens holder support mechanism must be high so that the holder can be easily moved by a small driving force. However, a high compliance not only reduces the mechanical strength of the apparatus, but also lowers its resistance to shock. It is possible to support the objective lens holder on the carriage by strong springs in order to increase the mechanical strength. However, this would reduce the compliance to an inappropriate level.

The primary object of the present invention is to provide an electromagnetic objective lens driving apparatus in which reflecting surfaces can be precisely formed on an objective lens holder at correct positions.

Another object of the present invention is to provide an electromagnetic objective lens driving apparatus having an acceptable compliance and a high mechanical strength. In other words, the present invention is aimed at providing an increase in the sensitivity of the objective lens holder without reducing the mechanical strength thereof.

SUMMARY OF THE INVENTION

The present invention is focused on an MID (i.e., Molded Interconnection Device) process to directly form a printed circuit on a plastic injection molded product. In the present invention, the objective lens holder on the carriage is made by plastic injection molding. The reflecting surfaces are directly formed on the outer surface of the plastic piece by plating.

It is possible to form a printed circuit for an electrical connection of the focusing and tracking coils and a power supply thereto on the outer surface of the objective lens holder by plating. The reflecting surfaces can be formed by the MID process in the same process as the formation of the printed circuit.

The MID process can be applied, for example, to print or draw an image or diagram onto a piece, by pad printing, printing, an optical plotter, a mechanical plotter, or by micro-sand blasting, etc.

Although any of the above mentioned applications can be used in the present invention, it has been experimentally confirmed that the optical plotting technology can be advantageously used to form plated reflecting surfaces and a printed circuit, according to the present invention.

The present invention is also focused on the existing focusing or tracking permanent magnets. Namely, in the present invention, the magnetic force of the focusing or tracking permanent magnets is employed to achieve both requirements of high mechanical strength and a high compliance.

According to the present invention, there is provided an electromagnetic objective lens driving apparatus of an optical disc data recording and reproducing apparatus, including a carriage which is movable in a radial direction of the optical disc and, an objective lens holder which is supported on the carriage to move in focusing and tracking directions of the optical disc. A pair of reflecting surfaces are provided on opposite end surfaces of the objective lens holder in the tracking direction and are directly formed on the outer surfaces of the objective lens holder as a plating, and a pair of photo sensors are provided on the carriage, with the photo sensors being opposed to the respective reflecting surfaces.

The objective lens holder can be made by plastic injection molding.

Preferably, the photo sensors are reflection type photo sensors, each having a light emitter and a light receiver.

The objective lens holder can be provided on the opposite end surfaces thereof with printed circuits formed by plating.

The reflecting surfaces can be formed by the same plating process as the printed circuits.

According to another aspect of the present invention, there is provided an electromagnetic objective lens driving apparatus of an optical disc data recording and reproducing apparatus, including a carriage which is movable in a radial direction of the optical disc and, an objective lens holder which supports an objective lens in a manner such that laser beams are converged onto the optical disc, and which is supported on the carriage to move in focusing and tracking directions of the optical disc. Focusing and tracking coils are provided on the objective lens holder, and focusing and tracking permanent magnets are provided on the carriage to constitute focusing and tracking magnetic driving circuits in association with the focusing and tracking coils. And a pair of magnetic members are provided on the objective lens holder to receive magnetic attractive forces of the focusing and/or tracking permanent magnets. The magnetic members are located so that when the objective lens holder is in a neutral position, the magnetic attractive forces to be received by the magnetic members from the focusing and/or tracking permanent magnets are substantially identical. When the objective lens holder is displaced from the neutral position, the magnetic attractive force to be received by one of the magnetic members is increased and the magnetic attractive force to be received by the other magnetic member is decreased, respectively.

According to still another aspect of the present invention, an electromagnetic objective lens driving apparatus of an optical disc data recording and reproducing apparatus includes an objective lens holder which supports an objective lens to converge laser beams onto the optical disc and a carriage which elastically supports the objective lens holder and permits movement of the lens holder. Focusing and tracking coils are provided on the objective lens holder, and focusing and tracking permanent magnets are provided on the carriage to constitute focusing and tracking electromagnetic driving circuits in association with the focusing and tracking coils. A pair of spaced magnetic members are provided on the objective lens holder to receive magnetic attractive forces of the focusing coils and/or the tracking coils.

As is well known, the magnetic attractive force is in inverse proportion to the square of distance. Consequently, when the objective lens holder, on which the magnetic members are provided, is moved from the neutral position thereof, the movement is effected at a high sensitivity. Namely, the movement is as if the objective lens holder is supported by a spring having a weak spring constant. On the other hand, when the objective lens holder is in the neutral position, the objective lens holder is retained therein by the strong magnetic attractive force of the pair of magnetics, as if the objective lens holder is supported by a spring having a strong spring constant.

BRIEF DESCRIPTION OF THE DRAWINGS

The invention will be described below in detail with reference to the accompanying drawings, in which.

DESCRIPTION OF THE PREFERRED EMBODIMENT

Figure 9:
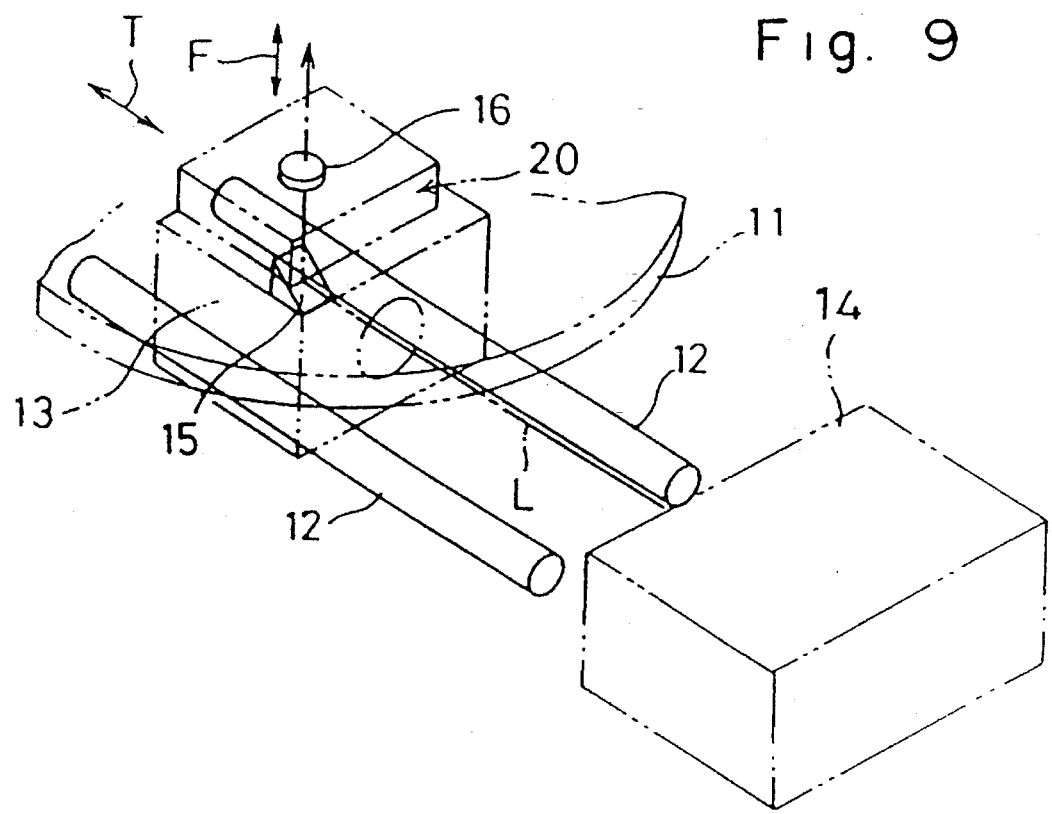
FIG. 9 is an isometric view of main components of an optical data recording and reproducing apparatus to which the present invention is applied.

As shown in FIG. 9, a pair of guide rails 12 are provided below an optical disc 11 which can be rotated and which extend in the radial direction of the optical disc 11. A carriage 13 is supported on the guide rails 12 to move along the same. Carriage 13 is provided thereon with a prism 15 which reflects the laser beams L, incident thereon from an immovable optical system 14, in the vertical direction. The carriage 13 is further provided with an objective lens 16 which converges the laser beams reflected by prism 15 onto the recording surface of optical disc 11, and an electromagnetic driving mechanism 20 which drives objective lens 16 in the focusing and tracking directions F and T, respectively.

An objective lens holder 21, which holds objective lens 16, is made by plastic injection molding. As can be seen in FIGS. 1 through 5, lens holder 21 is provided on the center portion thereof with a cylindrical holder portion 21a which holds objective lens 16 and a pair of wings 21b which diametrically and symmetrically project from cylindrical holder portion 21a in the radial directions. Namely, wings 21b are aligned along an axis passing through the center of cylindrical holder portion 21a. The axis corresponds to the tracking direction T. Wings 21b are provided therein with coil receiving through holes 21c in which focusing coils 33 are inserted and secured.

Focusing coils 33 lie in a plane in which wings 21b lie. Focusing coils 33 are provided with linear portions 33L extending in parallel with the tracking direction T.

Cylindrical holder portion 21a is provided on the outer surface thereof with two pairs of coil supporting projections 21d and 21e which project from both sides of cylindrical holder portion 21a in diametrical directions perpendicular to the tracking direction T. Upper coil supporting projections 21d are fitted in the center openings of corresponding tracking coils 34. Lower coil supporting projections 21e support the lower surfaces of tracking coils 34 located thereon. Tracking coils 34 lie in respective planes parallel with the plane of focusing coils 33 and are provided with linear coil portions 34L extending in the focusing direction F.

Figure 1:
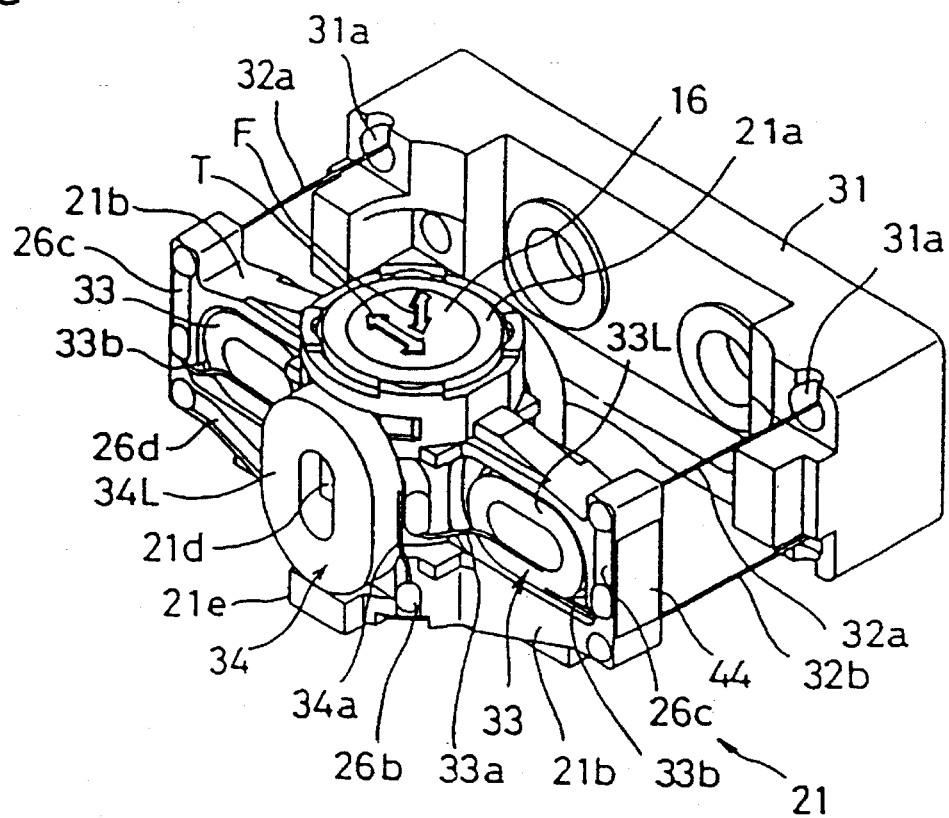
FIG. 1 is a isometric view of main components of an electromagnetic objective lens driving apparatus of an optical disc data recording and reproducing apparatus, according to the present invention.
Figure 2:
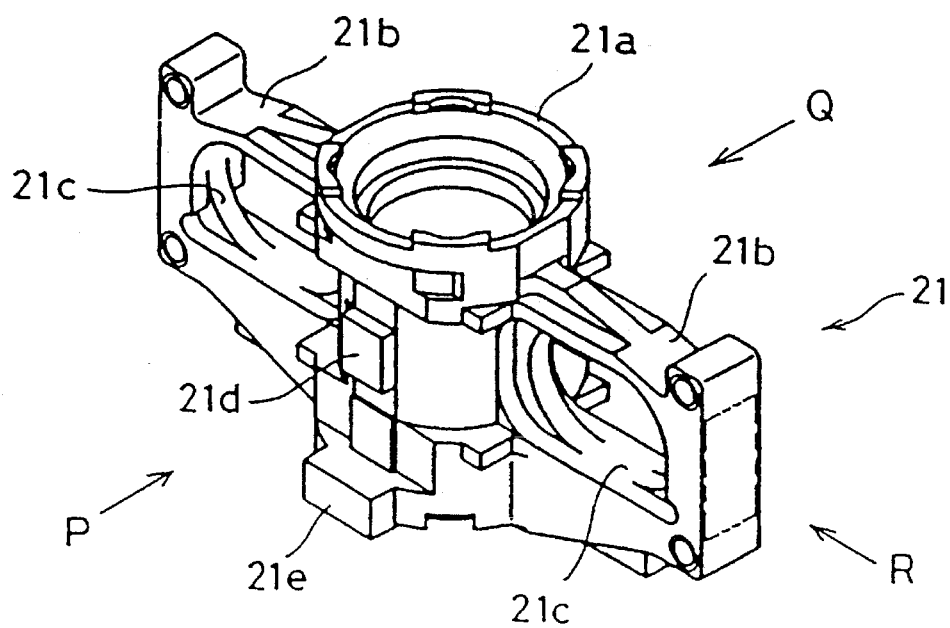
FIG. 2 is an isometric view of an objective lens holder according to the present invention.
Figure 3:
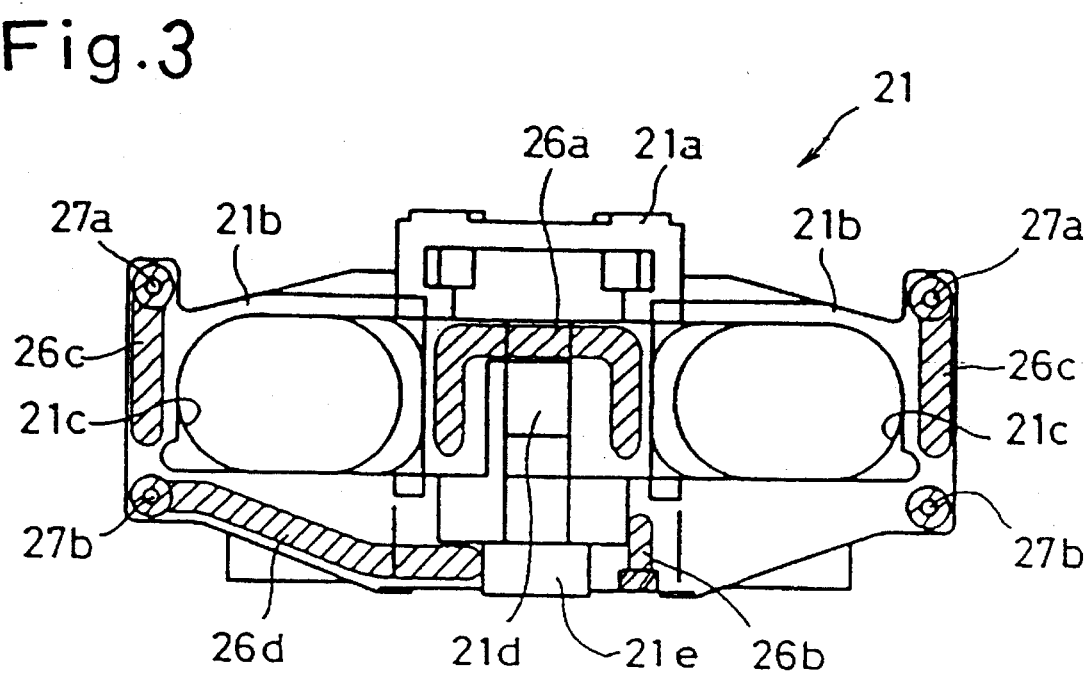
FIG. 3 is an end view of an objective lens holder, viewed from the direction P shown in FIG. 2.
Figure 4:
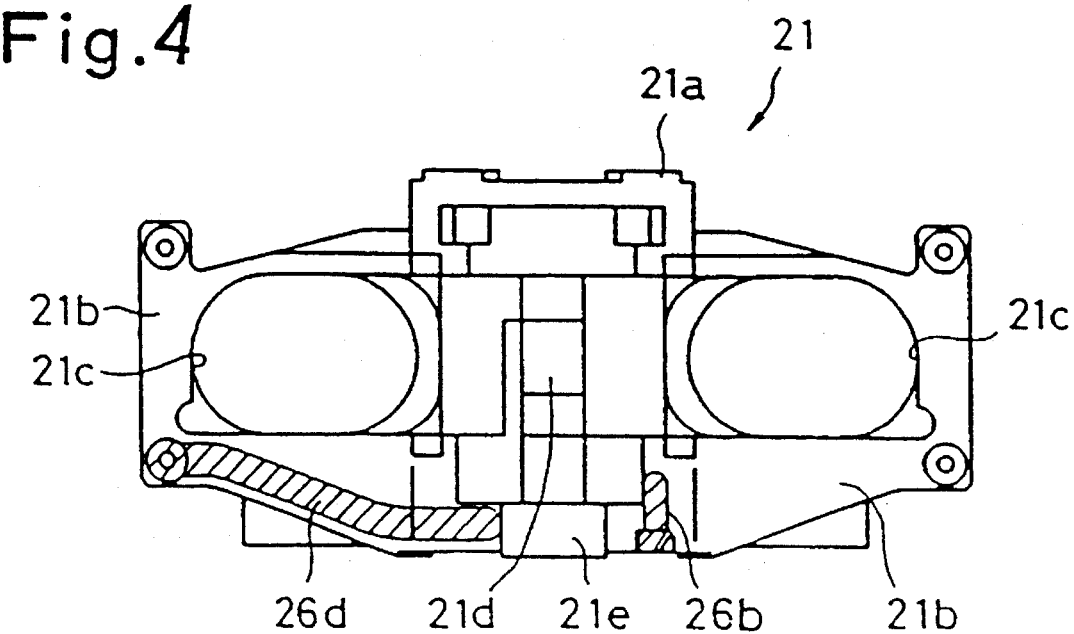
FIG. 4 is an end view of an objective lens holder, viewed from the direction Q shown in FIG. 2.
Figure 5:
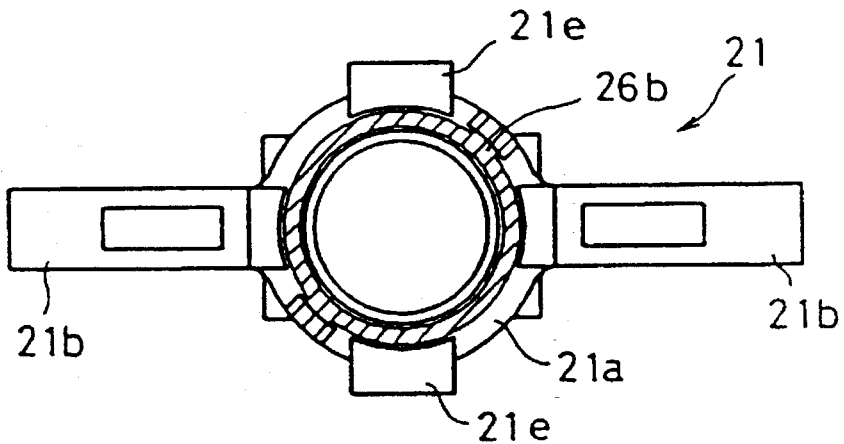
FIG. 5 is a bottom view of an objective lens holder, shown in FIG. 2.
Figure 6:
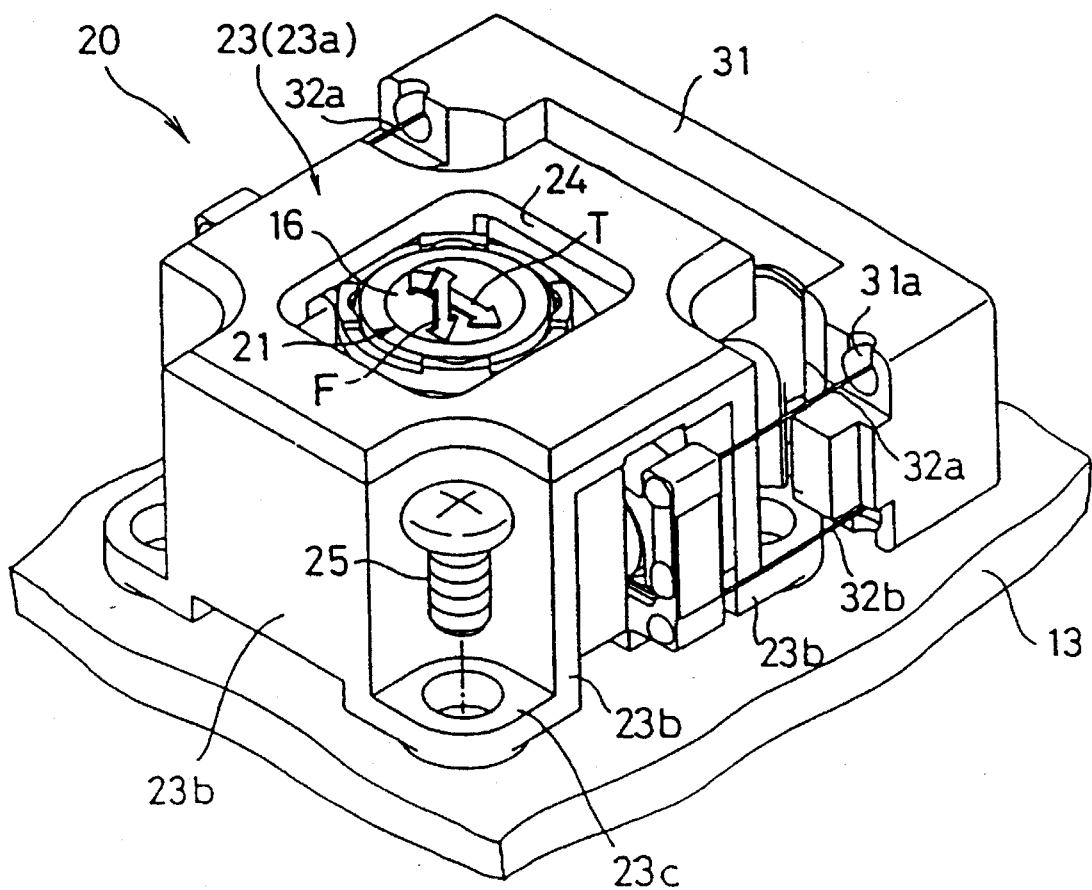
FIG. 6 is an isometric view of main components of an electromagnetic objective lens driving apparatus of an optical disc data recording and reproducing apparatus, according to another aspect of the present invention.
Figure 15:
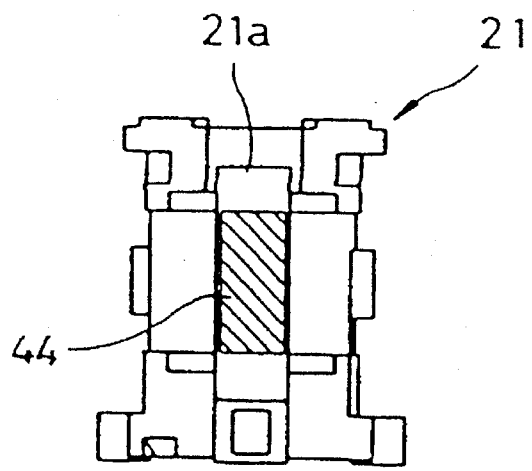
FIG. 15 is an end view of an objective lens holder, showing a reflecting surface thereof, viewed from the direction R shown in FIG. 2.

Objective lens holder 21 is provided, on end surfaces thereon in the tracking direction T, with reflecting surfaces 44, as shown in FIGS. 1 and 15. Reflecting surfaces 44 are directly formed on the end surfaces of wings 21a of objective lens holder 21, for example by the MID process. The printed circuit is also formed directly on the outer surface of objective lens holder 21 to electrically connect focusing coils 33 in series and tracking coils 34 in series, and to supply the focusing and tracking coils with electrical power, for example by the MID process. The printed circuit pattern is shown at hatched portions in FIGS. 3 through 5.

Cylindrical holder portion 21a is provided on the outer surface thereof with a first connecting portion 26a which surrounds one of upper coil supporting projections 21d to connect focusing coils 33, and a second connecting portion 26b which is formed on the lower portion and bottom of cylindrical holder portion 21a to connect tracking coils 34. Wings 21b are provided with current supply portions 26c which supply electrical power to focusing coils 33 and power supply portions 26d which supply electrical power to tracking coils 34. Current supply portions 26c and power supply portions 26d extend to suspension wire connecting holes 27a and 27b, respectively, formed on the upper and lower ends of wings 21b.

Terminal ends 33a (FIG. 1), of the pair of focusing coils 33, are soldered to the ends of first connecting portions 26a. Other terminal ends 33b of focusing coils 33 are soldered to the corresponding current supply portions 26c. Similarly, terminal ends 34a, of the pair of tracking coils 34, are soldered to the ends of second connecting portions 26b, and the other terminal ends (not shown) thereof are soldered to the corresponding power supply portions 26d, respectively.

Upper and lower suspension wires 32a and 32b are inserted in and soldered at one end thereof to the corresponding suspension wire connecting holes 27a and 27b. A pair of upper suspension wires 32a constitute a power supply line for the pair of focusing coils 33 connected in series. A pair of lower suspension wires 32b constitute a power supply line for the pair of tracking coils 34 connected in series, respectively.

Figure 10:
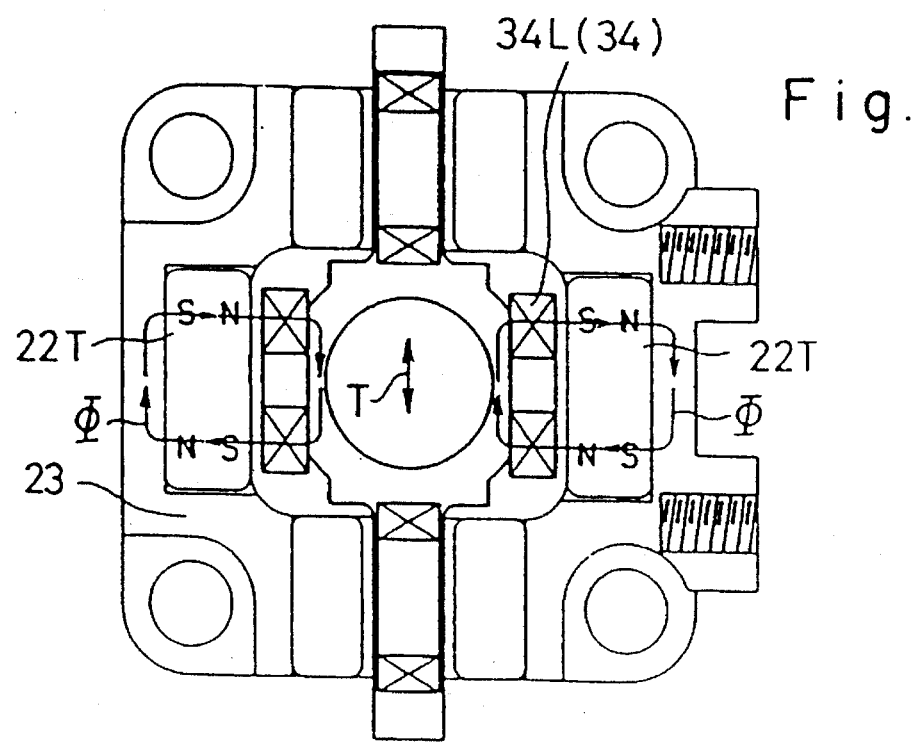
FIG. 10 is a plan view of a magnetic circuit of tracking permanent magnets which constitute an electromagnetic driving circuit, according to the present invention.
Figure 11:
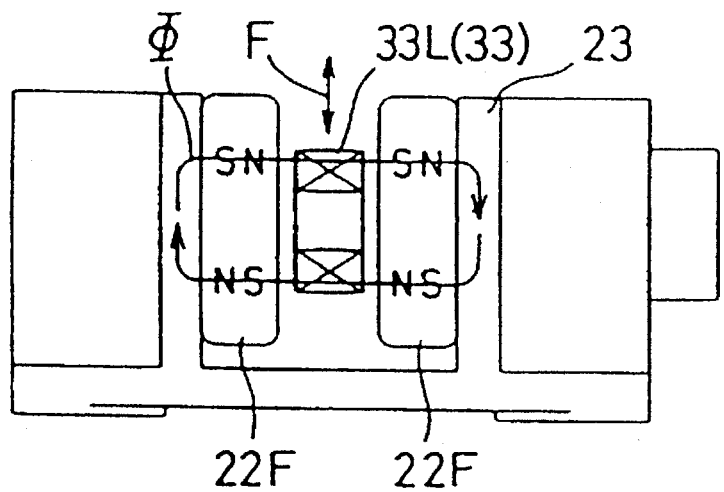
FIG. 11 is a plan view of a magnetic circuit of focusing permanent magnets which constitute an electromagnetic driving circuit, according to the present invention.
Figure 12:
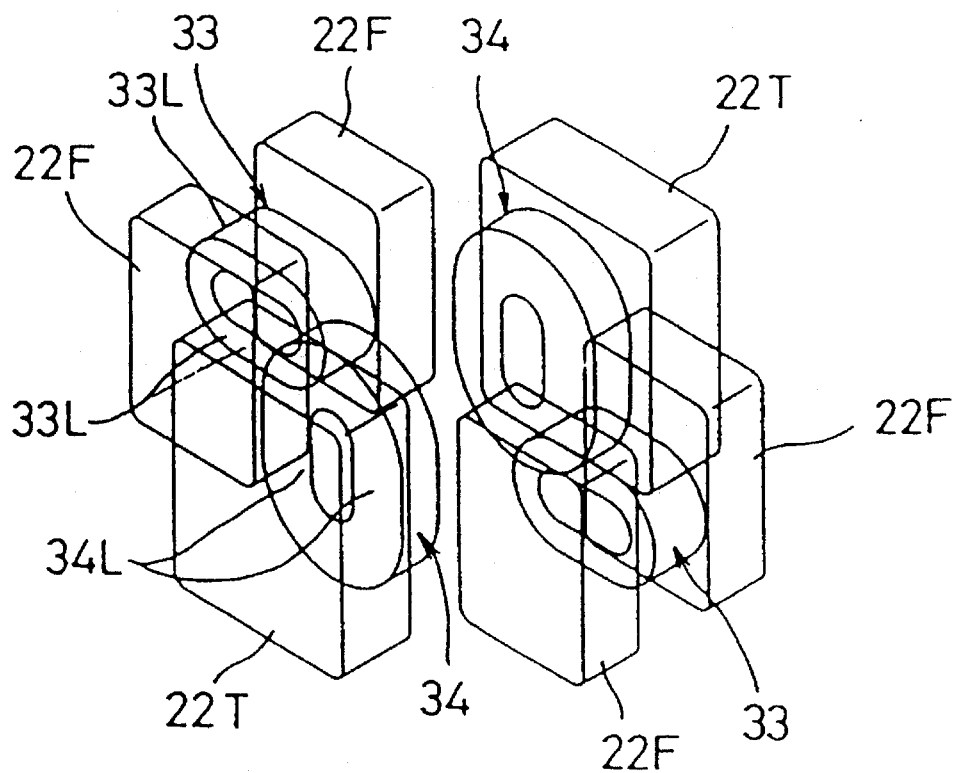
FIG. 12 is an isometric view of an arrangement of focusing and tracking coils and permanent magnets of an electromagnetic circuit, according to the present invention; and, FIG. 13 is a front elevational view of a printed circuit of a supporting block.

The magnetic circuit, which constitutes electromagnetic driving circuits together with focusing coils 33 and tracking coils 34, is provided on carriage 13. The magnetic circuit includes two pairs of focusing permanent magnets 22F, a pair of tracking permanent magnets 22T, and a yoke member 23 made of a magnetic material. The two focusing permanent magnets 22F of each pair are located on opposite sides of each focusing coil 33 of each wing 21b. The two tracking permanent magnets 22T are located on opposite sides of cylindrical holder portions 21a, so that a pair of tracking coils 34 are placed between tracking permanent magnets 22T. The arrangement of the focusing and tracking permanent magnets 22F and 22T and the polarities thereof are shown in FIGS. 10 through 12. The polarities of focusing and tracking permanent magnets 22F and 22T are such that linear coil portions 33L and 34L of focusing coils 33 and tracking coils 34 are perpendicular to the magnetic flux $\Phi$ produced by focusing permanent magnets 22F and tracking permanent magnets 22T. Consequently, the driving force in the focusing direction F (i.e., up and down directions) is produced in objective lens holder 21 in accordance with the electric current flowing in linear coil portions 33L in the forward direction or reverse direction. Similarly, the driving force in the tracking direction T (i.e., forward and reverse direction) is produced in objective lens holder 21 in accordance with the electric current flowing in linear coil portions 34L in the forward direction or the reverse direction thereof.

The focusing (i.e., focus controlling) electromagnetic circuit, formed by focusing coils 33 and focusing permanent magnets 22F, is arranged so as not to interfere with the tracking (i.e., tracking controlling) electromagnetic circuit formed by tracking coils 34 and tracking permanent magnets 22T. Consequently, no driving force in tracking direction T is produced in objective lens holder 21 by the electric current flowing in focusing coils 34. No driving force in the focusing direction F is produced in objective lens holder 21 by the electric current flowing in tracking coils 34. Thus, a precise and independent control in the tracking and focusing directions T and F can be achieved.

Figure 7:
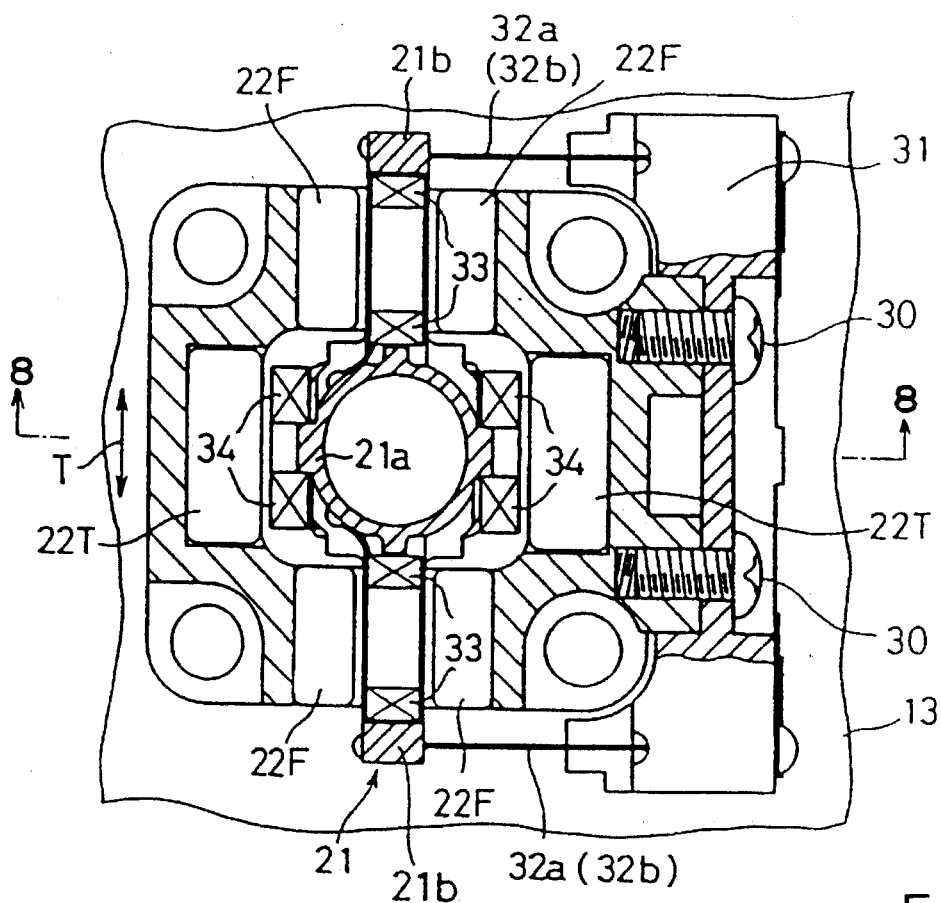
FIG. 7 is a sectional view along the line 8—8 in FIG. 8.

Yoke member 23 which supports focusing permanent magnets 22F and tracking permanent magnets 22T includes a magnetic shield wall 23a opposed to the optical disc 11 in parallel therewith, a plurality of yoke walls 23b projecting perpendicularly from the peripheral edge of the magnetic shield wall 23a towards carriage 3, and a plurality of mounting flanges 23c which extend from yoke walls 23b and lie on carriage 13. Magnetic shield wall 23a, yoke walls 23b, and mounting flanges 23c are an integral structure. Magnetic shield wall 23a is provided with a laser transmission hole 24 in which objective lens 16 is movable, so that the laser beams L pass through laser transmission hole 24. Mounting flanges 23c are secured to carriage 13 by mounting screws 25. Supporting block 31 is secured to yoke member 23 by mounting screws 30 (FIG. 7).

The ends of the suspension wires 32a and 32b extending away from the objective lens holder 21 (i.e., right ends in FIG. 7) are secured to supporting block 31. Objective lens holder 21 and, accordingly, objective lens 16 are movable in the focusing direction F and the tracking direction T by the elasticity of suspension wires 32a and 32b. Suspension wire receiving holes 31a of supporting block 31 have a diameter sufficiently larger than the diameter of suspension wires 32a and 32b, so that the spaces between suspension wire receiving holes 31a and associated suspension wires 32a and 32b are preferably filled with an appropriate damper (e.g., gel, etc.) to damp the oscillation of suspension wires 32a and 32b.

Figure 13:
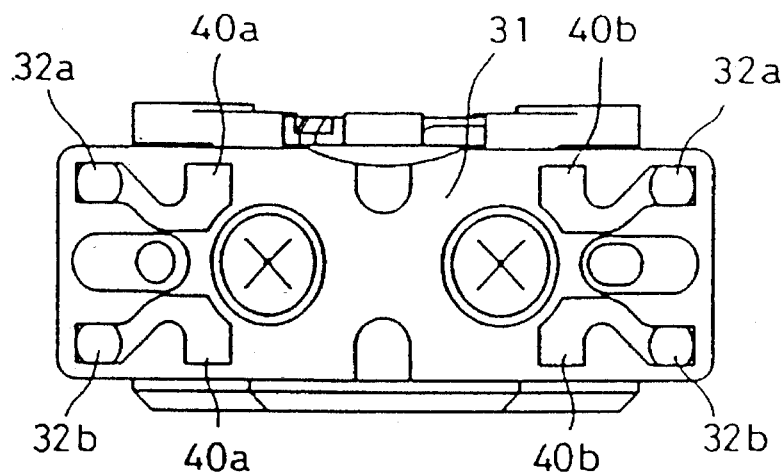
Figure 14:
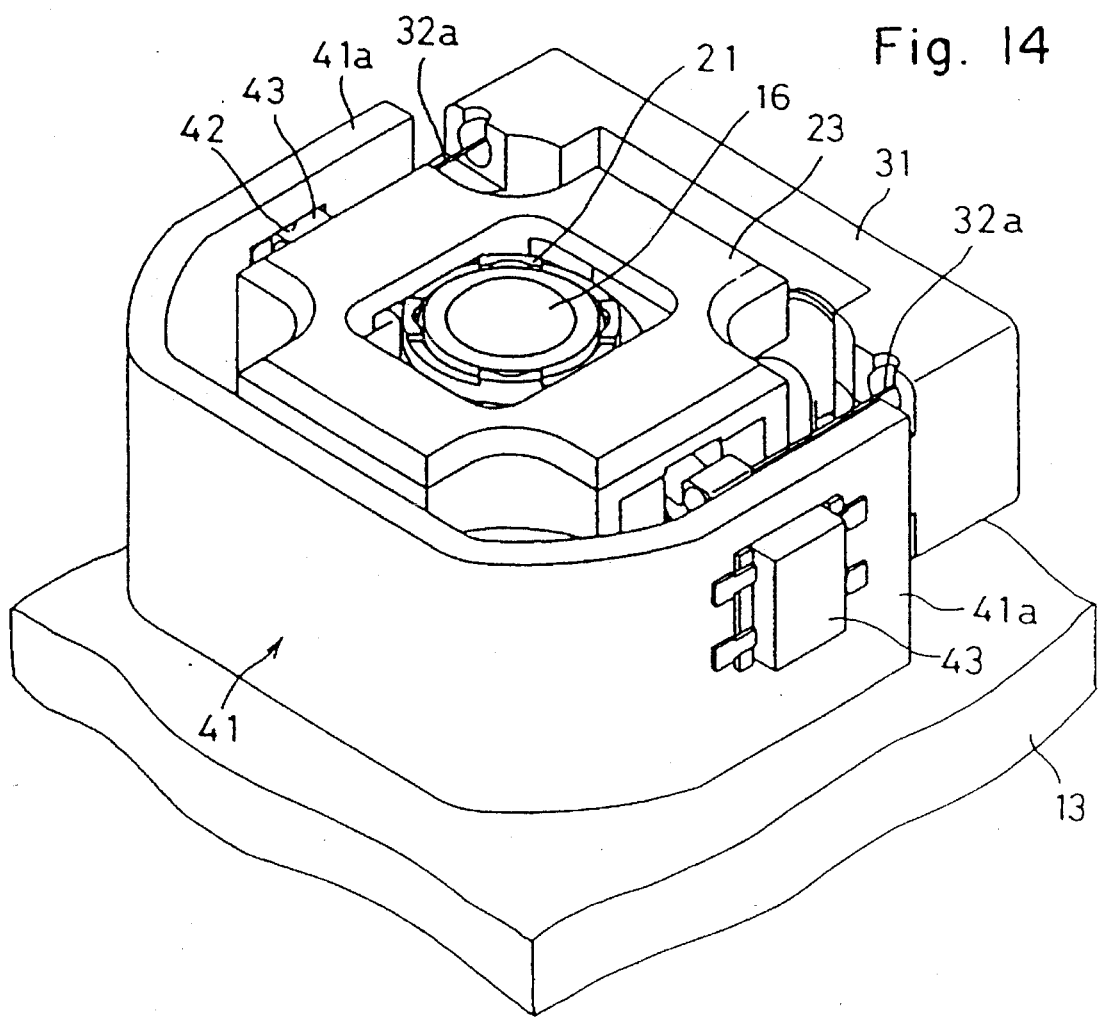
FIG. 14 is an isometric view of main components of an electromagnetic objective lens driving apparatus including a sensor holder, according to another aspect of the present invention.

Supporting block 31 is made by plastic injection molding, and is provided with the electrical circuit printed thereon, for example, by the MID process to supply the electric power to suspension wires 32a and 32b. The printed circuit pattern shown in FIG. 13 includes power supply terminals 40a and 40b connected to suspension wires 32a and 32b, respectively.

Sensor holder 41, which is adapted to detect the position of objective lens 16 (or objective lens holder 21), is also provided with a printed circuit. Sensor holder 41 which is secured to carriage 13 is generally U-shaped to surround the three surfaces (including the two surfaces in the tracking direction T) of yoke member 23, which is generally rectangular in a plan view. Sensor holder 41 includes two opposed side walls 41a perpendicular to the tracking direction T, that are provided therein with sensor mounting windows 42 in which a pair of reflection type photo sensors 43 are fitted and secured. Photo sensors 43 are opposed to the corresponding reflecting surfaces 44 of the objective lens holder 21.

Each of the reflection type photo sensors 43 includes a light emitter 43a, located next to optical disc 11, and a light receiver 43b distant from optical disc 11, so that beams of light emitted from light emitters 43a are reflected by corresponding reflecting surfaces 44 and are then received by associated light receivers 43b.

Figure 16:
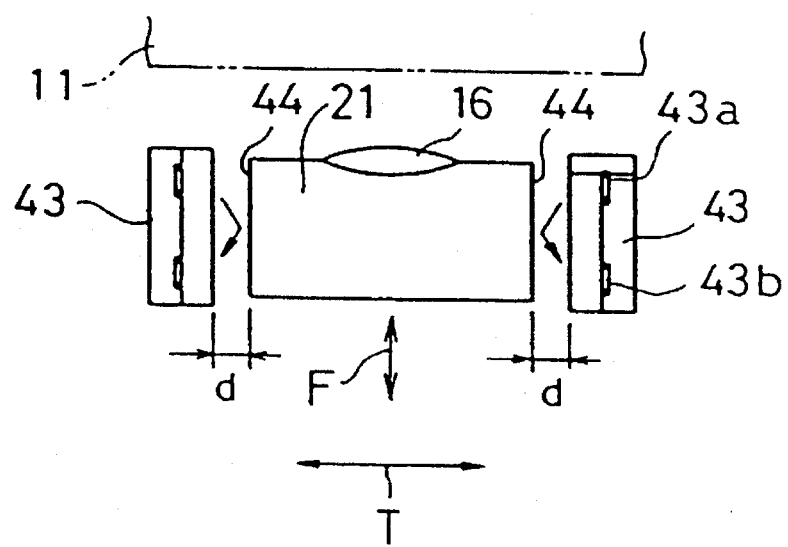
FIG. 16 is a front elevational view of a reflection type photo sensor and a reflecting surface of an objective lens holder.
Figure 17:
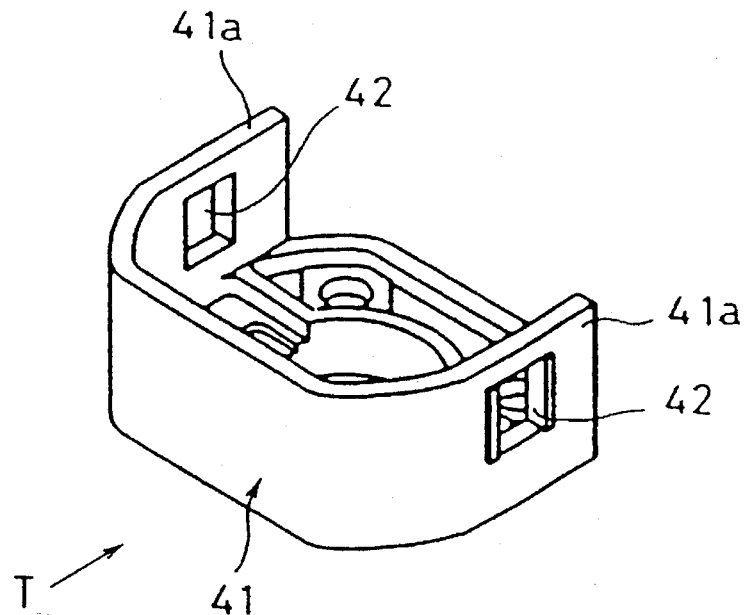
FIG. 17 is an isometric view of a sensor holder.
Figure 21:
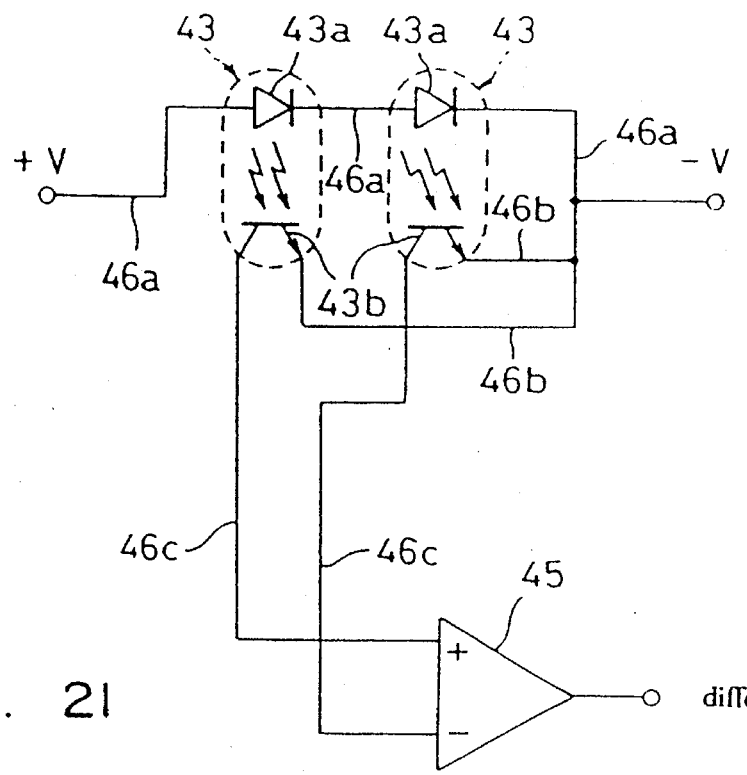
FIG. 21 is a circuit diagram of an electrical connection of a pair of reflection type sensors.
Figure 22:
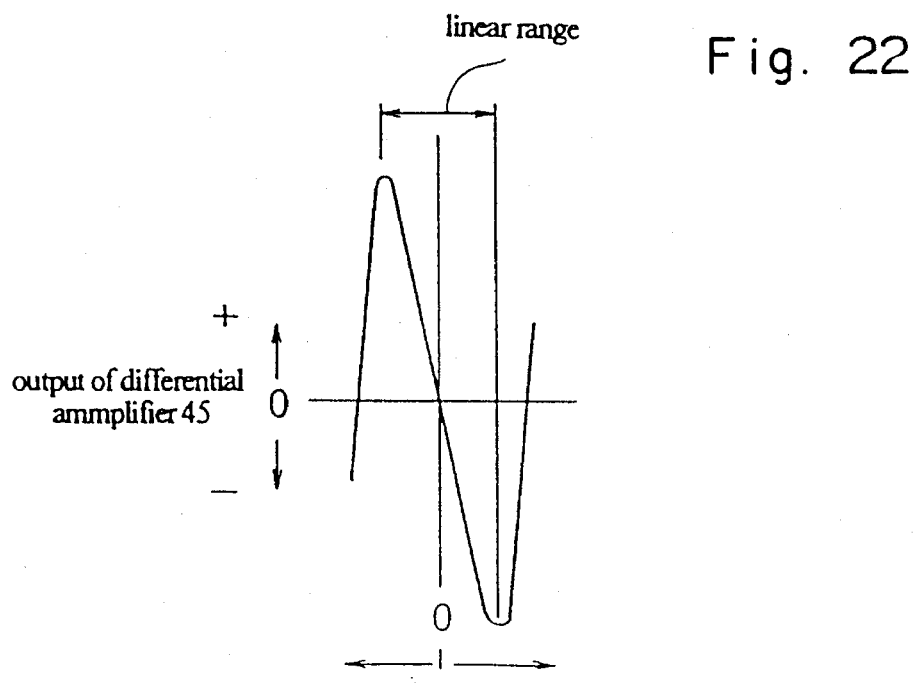
FIG. 22 is a diagram showing a relationship between outputs of a differential amplifier shown in FIG. 21 and displacement and direction of an objective lens.

FIG. 21 shows an electric connection between the two reflection type photo sensors 43. In the arrangement shown in FIG. 21, light emitters 43a are electrically connected to a power source and the output terminals of light receivers 43b are connected to positive and negative input terminals of differential amplifier 45, respectively. The outputs of light receivers 43b vary in accordance with the change of the distance "d" (FIG. 16) between reflection type photo sensors 43 and the associated reflecting surfaces 44. Accordingly, displacement of objective lens holder 21 (or objective lens 16) from the neutral position thereof in the tracking direction T can be detected in accordance with the outputs of differential amplifier 45, as shown in FIG. 22.

Figure 18:
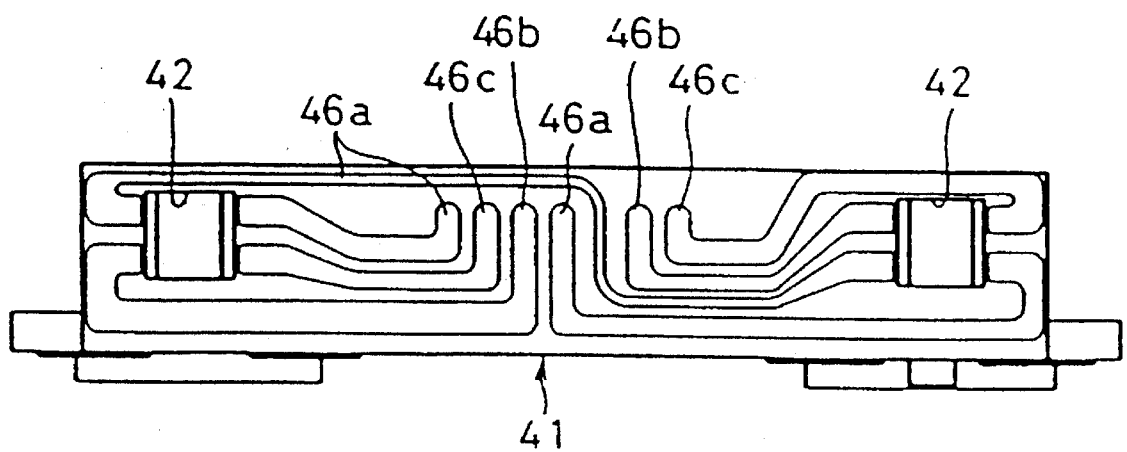
FIG. 18 is a developed view of a printed circuit of a sensor holder, viewed in the direction T shown in FIG. 17.

Sensor holder 41 is made by plastic injection molding and is provided on the outer surface thereof with a circuit pattern printed thereon to surround the reflection type photo sensors 43, for example, by the MID process, as shown in FIG. 18. The printed circuit includes power supply terminals 46a connected to light emitters 43a of the reflection type photo sensors 43, power supply terminals 46b connected to light receivers 43b, and output terminals 46c of light receivers 43b.

Figure 19:
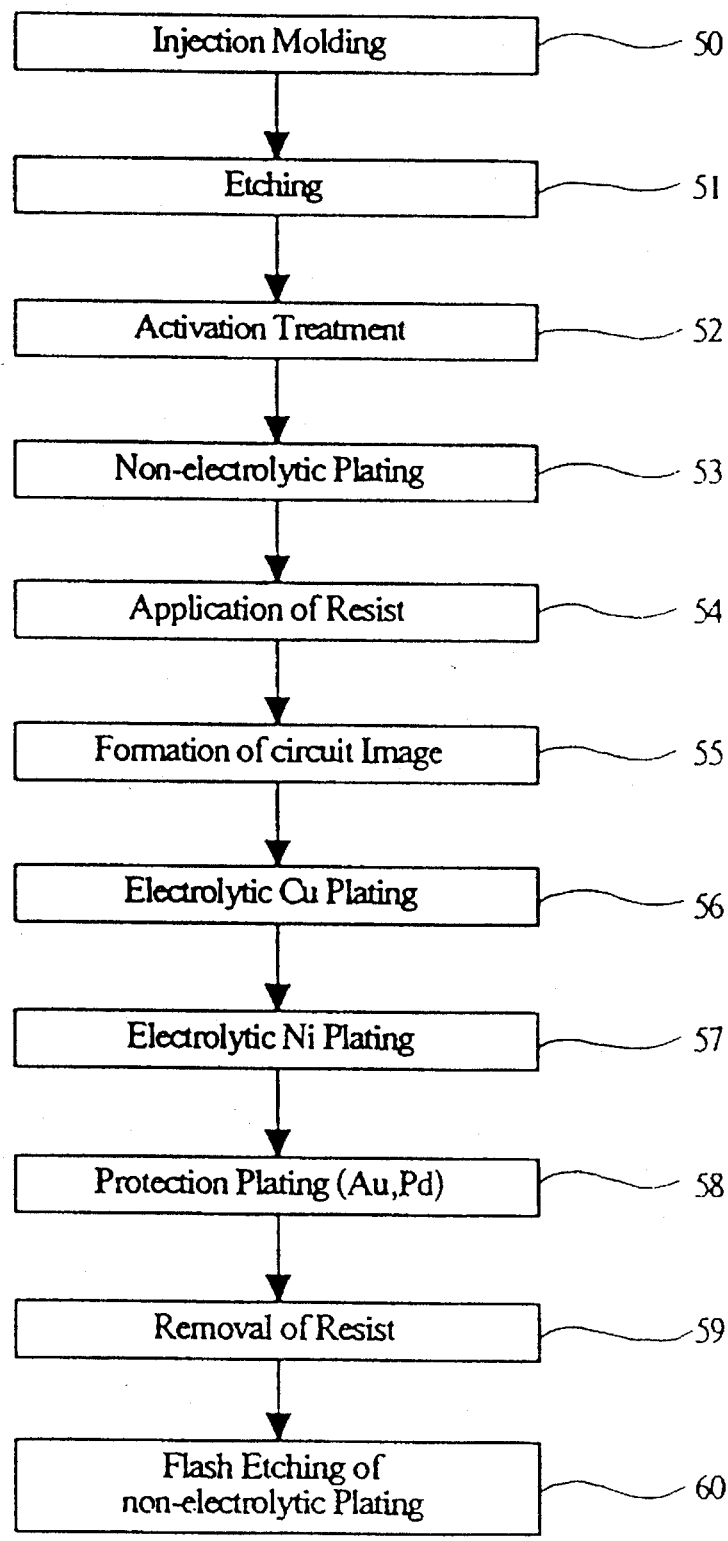
FIG. 19 is a block diagram outlining a formation of a printed circuit using a molded interconnection device (MID), according to the present invention.

FIG. 19 shows an optical plotting process for simultaneously forming the printed circuit (i.e., circuit elements 26a through 26e) of objective lens holder 21, printed circuits 40a and 40b of supporting block 31, reflecting surfaces 44, and a printed circuit of sensor holder 41 (i.e., circuit elements 46a through 46c) of sensor holder 41, using the MID process by way of example.

First, objective lens holder 21, supporting block 31, and sensor holder 41 are injection molded at step 50. Thereafter, the molds thus obtained are subject to an etching process 51, and an activation treatment 52, and are then uniformly plated by a non-electrolysis plating process. Thereafter, the plated molds are coated with a photo-etching resist layer by a resist applying process 54. After that, a predetermined image of circuit pattern is formed by an optical circuit imaging process 55. The circuit pattern image is subject to an electrolytic copper plating process 56, an electrolytic nickel plating process 57, and a protection plating process 58, so that the image is actualized as a circuit pattern. Thereafter, the unnecessary residual resist layer is removed by a resist removal process 59, and then the molds are finished by being subject to a flash etching process 60 of the non-electrolytic plating.

In the electromagnetic driving mechanism 20 as constructed above, a driving current for the focusing operation is supplied to focusing coils 33 through suspension wires 32a, and the driving current for the tracking operation is supplied to tracking coils 34 through suspension wires 32b, respectively- When the focusing driving current is supplied to focusing coils 33, objective lens holder 21 and, accordingly, objective lens 16 are electromagnetically driven in the focusing direction F in accordance with the direction and intensity of the driving current supplied thereto. Similarly, when the tracking driving current is supplied to tracking coils 34, objective lens holder 21 and, accordingly, objective lens 16, are electromagnetically driven in the tracking direction T in accordance with the direction and intensity of the driving current supplied thereto. Thus, the laser beams L can be correctly converged onto a predetermined recording track of optical disc 11 by objective lens 16 in accordance with the control of the driving current to be supplied to focusing coils 33 or tracking coils 34.

Figure 20:
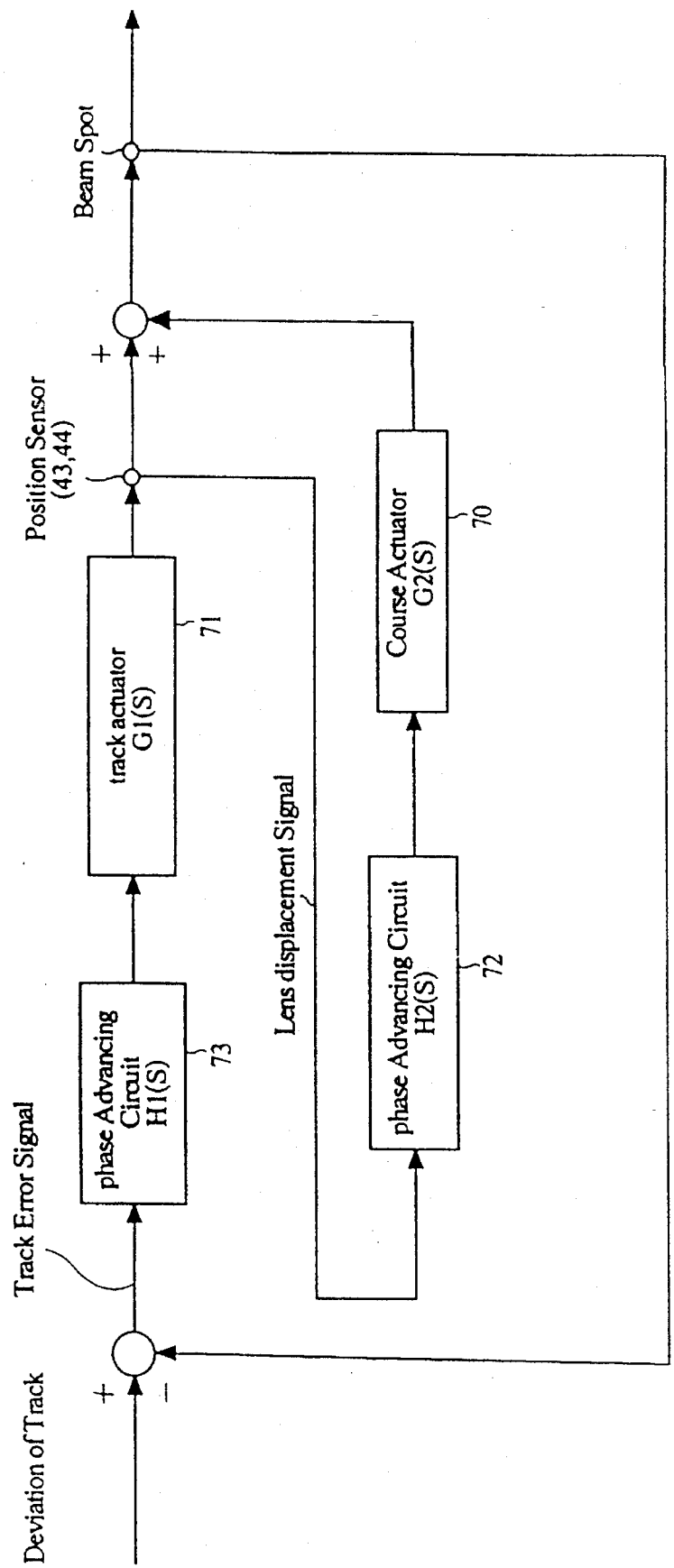
FIG. 20 is a block diagram of a tracking control operation of an objective lens, by way of example.

FIG. 20 shows a block diagram of a tracking control including a course actuator 70 for moving carriage 13, and a track actuator 71 formed by tracking permanent magnets 22T and tracking coils 34. Carriage 13 is moved along guide rails 12 in the radial direction of optical disc 11 by course actuator 70 and a phase advancing circuit 72, in accordance with the tracking signals. If the laser beam is not converged onto optical disc 11 by objective lens 16, objective lens 16 (i.e., objective lens holder 21) is moved through phase advancing circuit 73 and track actuator 71 in accordance with a track error signal. If there is a large displacement of objective lens 16 by track actuator 71, the track error signal changes due to the change in the distribution of the quantity of light. To prevent this, the position of objective lens 16 is detected by a position sensor constituted by reflection type photo sensors 43 and reflecting surfaces 44, so that carriage 13 is moved in a direction to cancel the track error by the feed-back control system in accordance with the position data.

The following discussion will be addressed to another embodiment of the present invention whose subject is directed to an elastic supporting mechanism of objective lens holder 21. In this embodiment, the invention is applied to the tracking direction T, by way of example.

Figure 8:
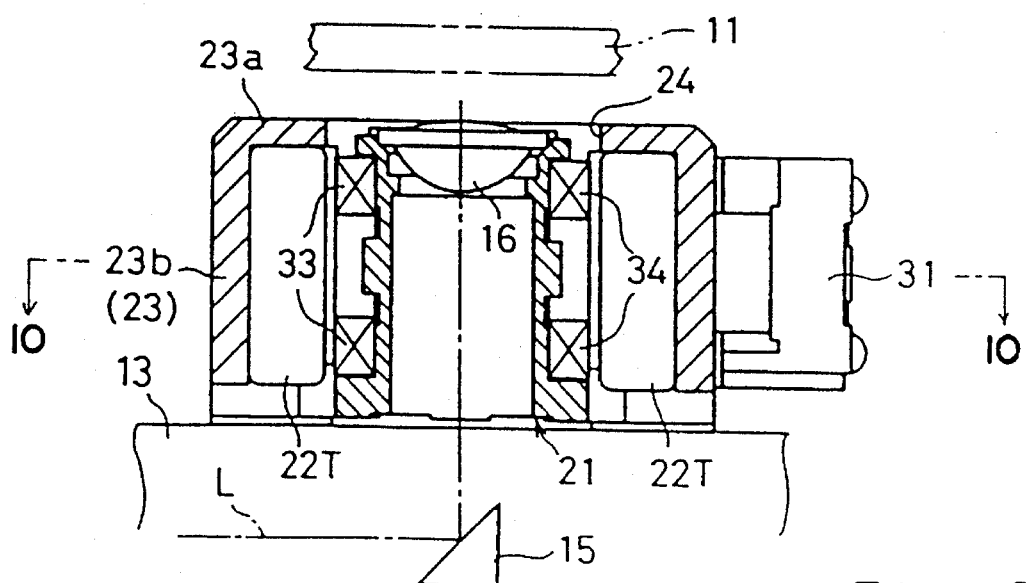
FIG. 8 is a sectional view along the line 10—10 in FIG. 7.

Objective lens holder 21 is supported on carriage 13 (i.e., supporting block 31) by the four suspension wires 32a and 32b, as mentioned above. The arrangement of tracking permanent magnets 22T and the positional relationship thereof to objective lens holder 21 are shown in FIGS. 7, 8 and 10, etc. Objective lens holder 21 is located between a pair of tracking permanent magnets 22T. Objective lens holder 21 is provided on the ends thereof with a pair of current supply portions 26c (FIG. 1) which are made of printed circuits. Current supply portions 26c are located so that when objective lens holder 21 is in the neutral position, current supply portions 26c are symmetrical with respect to the center of tracking permanent magnets 22T.

The printed circuits are formed in the process shown in FIG. 19. Current supply portions 26c contain therein a magnetic material such as nickel (Ni). Consequently, when objective lens holder 21 is in the neutral position, current supply portions 26 receive the identical magnetic attractive force from tracking permanent magnets 22T. The magnetic attractive force holds objective lens holder 21 in the neutral position together with suspension wires 32a and 32b.

When a slight movement of objective lens holder 21 in the tracking direction (i.e., forward or reverse direction) takes place due to the current flow supplied to tracking coils 34, the balance of the magnetic attractive forces of tracking permanent magnets 22T is disrupted. Namely, when current supply portions 26c are moved towards respective permanent magnets 22T, the magnetic attractive forces thereof are increased. Conversely, when current supply portions 26c are moved away from the respective permanent magnets 22T, the magnetic attractive forces thereof are decreased. Since the increase or decrease of the magnetic attractive force is inversely proportional to the square of the displacement of current supply portions 26c, once objective lens holder 21 is moved from the neutral position, a further movement results due to the decreased force. Thus, the compliance of the objective lens holder 21 is increased.

Figure 23:
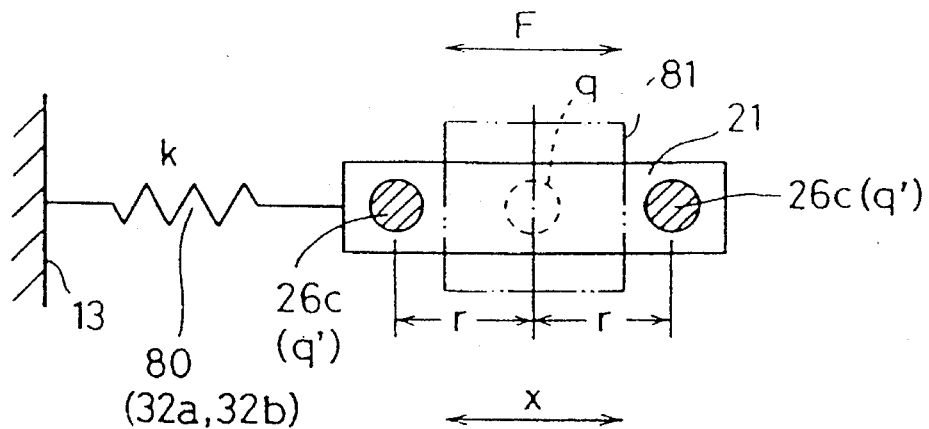
FIG. 23 is a schematic view of magnetic members on an objective lens holder and a magnetic circuit thereof; and, FIG. 24 is a diagram showing a frequency response function of a compliance of an objective lens holder according to the present invention, in comparison with a prior art (comparative example).

FIG. 23 schematically shows an oscillation system in which objective lens holder 21 whose mass is "m" is supported on carriage 13 by a spring 80 whose spring constant is "k". In FIG. 23, objective lens holder 21 is provided with a pair of magnetic members 26c symmetrically spaced from the center of magnetic circuit 81 at an equal distance "r". In the oscillation system shown in FIG. 23, when there is a displacement of the mass by "x", caused by an external force F applied thereto in the tracking direction T, the balance of the force is represented by;

$$F - kx = 0 \quad \text{①}$$

The attractive forces F; acting on magnetic members 26c by magnetic circuit 81, have opposite directions and are given by;

$$F = \epsilon_o qq'/4\pi r^2 \quad \text{②}$$
$$= a/4r^2 \quad (a = \text{constant})$$

wherein "q'" designates the magnetic charges of the magnetic members 26c on objective lens holder 21, and "q", the equivalent magnetic charges by magnetic circuit 81c, respectively.

When the displacement of objective lens holder 21 by "x" occurs, $$F + \Delta F - kx = 0 \quad \text{③}$$

wherein $\Delta F$ designates the magnetic attractive force. From the equation ②, we have;

$$\Delta F = a/4(r-x)^2 - a/4(r+x)^2 \quad \text{④}$$
$$= 4arx/4(r^2 - x^2)^2$$
$$\approx ax/r^3 \quad (r \gg x)$$
$$= bx \quad (b = \text{constant}).$$

From equations ③ and ④ above, the following equation is obtained:

$$F + bx - kx = 0 \quad F = (k-b)x \quad \text{⑤}$$

Comparing equations ⑤ and ①, the forces acting on magnetic members 26c equivalently function to reduce the spring constant "k". The decrease of the constant "k" means an increase of the sensitivity (1/(k−b)), while maintaining the dynamical rigidity (k) from a view point of an output and input response.

The sensitivity S and inherent oscillation frequency f, when no magnetic member 26c is provided are given by;

$$S = x/F = 1/k$$

$$f = (k/m)^{1/2}/2\pi.$$

When magnetic members 26c are provided, S and f are replaced with S' and f', below;

$$S' = 1/(k-b)$$

$$f' = \{(k-b)/m\}^{1/2}/2\pi.$$

Figure 24:
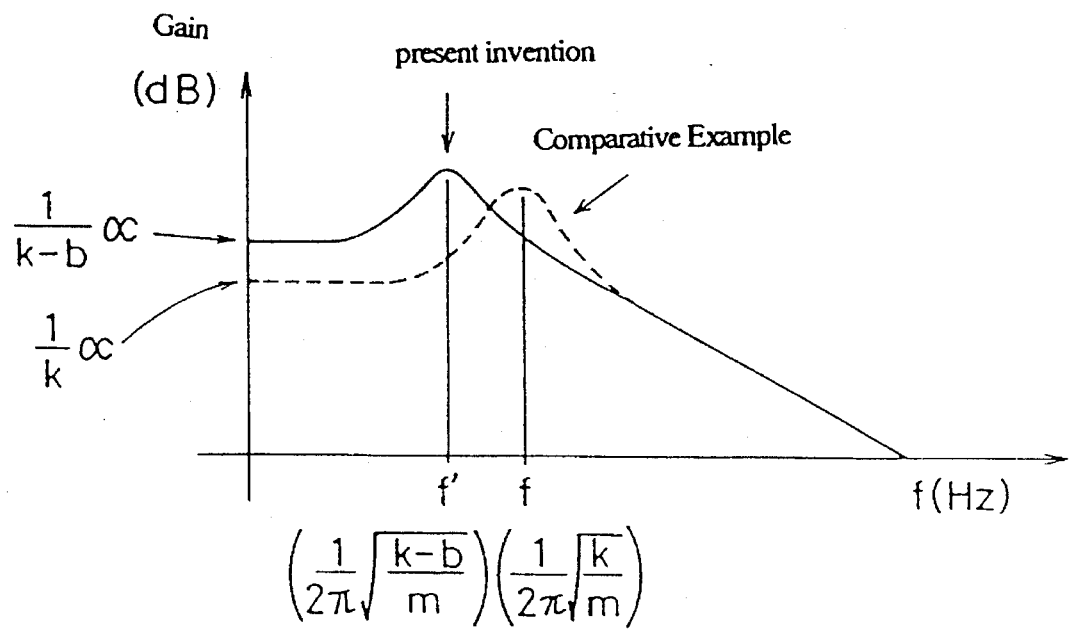

FIG. 24 shows a graph of the frequency response function of the compliance discussed above. In FIG. 24, the present invention in which magnetic members 26c are provided is represented by a solid line and the comparative example in which no magnetic members 26c are provided is represented by a phantom line, respectively. As can be seen in FIG. 24, according to the present invention, an increased sensitivity and a low inherent oscillation frequency can be obtained.

Although magnetic members 26c are printed circuits formed by the MID process in the illustrated embodiment, it is possible to form the magnetic members on objective lens holder 21 by means other than the printed circuit prepared by the MID process. In this alternative, the magnetic members can be adhered to the outer surface of objective lens holder 21 by an appropriate adhesive.

Although the above discussion has been directed to the embodiment applied to the tracking direction T, the present invention can be equally applied to the focusing direction F.

As can be understood from the above discussion, a position sensor having a pair of reflecting surfaces provided on both ends of the objective lens holder in the tracking direction, and reflection type photo sensors are provided on the carriage to be opposed to the respective reflecting surfaces. Each photo sensor consisting of a light emitter and a light receiver. According to the present invention, the reflecting surfaces are directly formed (i.e., plated) on the outer surface of the objective lens holder, which is made of a plastic injection molded piece, so that the precision of the position of the reflecting surfaces can be increased. Consequently, a precise position sensor can be obtained. Furthermore, when mirrors as separate pieces are not used, the assembly and maintenance of components is simplified.

Furthermore, according to the present invention, since a pair of magnetic members are symmetrically provided on the objective lens holder to receive the magnetic, force(s) of the focusing permanent magnets and/or the tracking permanent magnets secured to the carriage, the magnetic attractive forces to be received by the magnetic members from the focusing and/or tracking permanent magnets are substantially identical, when the objective lens holder is in the neutral position. When the objective lens holder is displaced from the neutral position, the magnetic attractive force to be received by one of the magnetic members is increased, and the magnetic attractive force to be received by the other magnetic member is decreased. Thus, not only an increase of the mechanical supporting strength but also a high compliance of the objective lens holder can be achieved according to the present invention.

I claim:

1. An electromagnetic objective lens driving apparatus of an optical disc data recording and reproducing apparatus, comprising:

a carriage that is movable in a radial direction of an optical disc;

an objective lens holder that is supported on the carriage to move in focusing and tracking directions of the optical disc, said objective lens holder comprising an integral plastic injection molded element including printed circuits plated onto opposite end surfaces;

a pair of reflecting surfaces which are provided on opposite end surfaces of the objective lens holder in a tracking direction, said reflecting surfaces being directly plated on the outer surfaces of the objective lens holder said reflecting surfaces and said printed circuits being formed by a same plating process; and, a pair of photo sensors provided on the carriage, positioned opposite to the respective reflecting surfaces and comprising reflection type photosensors each having a light emitter and a light receiver.

2. The electromagnetic objective lens driving apparatus of claim 1, further comprising focusing and tracking coils provided on the objective lens holder.

3. The electromagnetic objective lens driving apparatus of claim 2, wherein said printed circuits include terminals to be connected to the focusing and tracking coils to supply the same with electrical power.

4. The electromagnetic objective lens driving apparatus of claim 2 further comprising a sensor holder provided on the carriage to support the reflection type photo sensors.

5. The electromagnetic objective lens driving apparatus of claim 4, wherein said sensor holder is provided on an outer surface thereof with a predetermined printed circuit pattern which constitutes electrical wiring to supply electrical power to the photo sensors.

* * * * *